United States Patent Office 2,845,782
Patented Aug. 5, 1958

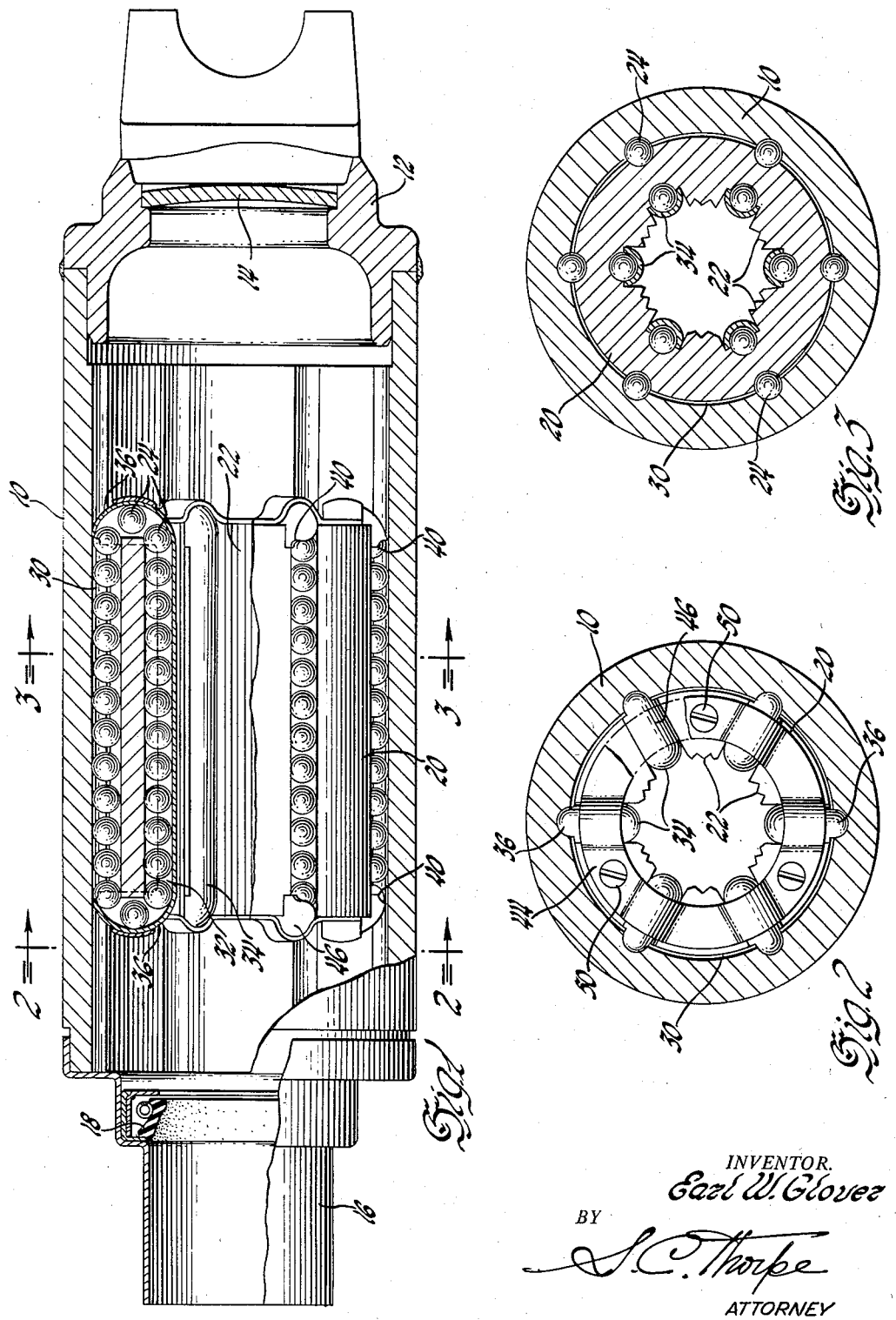

2,845,782
BALL BEARING SPLINE

Earl W. Glover, Saginaw, Mich., assignor to General Motors Corporation, Detroit, Mich., a corporation of Delaware Application June 6, 1957, Serial No. 664,111

4 Claims. (Cl. 64—23)

This invention relates to motion-transmitting devices and more particularly concerns a motion-transmitting device incorporating telescopically related members interconnected by anti-friction elements allowing for relative axial movement of the members while preventing rotary movement thereof.

Devices of this type have a wide field of use in diverse industries. Thus, they are employed in machine tools, for example, and in actuators of various designs, including aircraft control actuators. Recently, it has been proposed to apply such a device between the differential gearing and inner universal joints of rear axle assemblies which have been developed for use in automotive vehicles comprising independently sprung rear wheels. In this application, the device serves as the slip joint compensating for lengthening and fore-shortening of the half axle at either side of the differential incident to the displacements of the corresponding road wheel.

The embodiment of the invention to be specifically described is contemplated for employment in installations as just described but the same is well adapted for other applications. In the accompanying drawings illustrating the particular embodiment, Figure 1 is a longitudinal section through the slip joint, while Figures 2 and 3 are sections taken on the lines 2—2 and 3—3 in Figure 1.

Referring first to Figure 1, there is shown a tubular member 10 closed at one end by an adaptor 12 through which such member may be connected to the inner component of a universal joint incorporated in the half axle, not shown. A closure plug 14 fitted into the adaptor prevents entry of dirt and other foreign matter.

At its end opposite the adaptor the tubular member 10 has connected thereto as by welding, for instance, a housing 16 internally formed for the accommodation of an oil seal 18. An inner hollow member 20, telescopically received within member 10, will be seen as splined at 22 (Figure 3) to the end that it may be drivingly connected to a shaft which in the completed assembly extends through the housing 16 and seal 18 from the differential gearing, not shown.

Member 20 will be noted as connected to tubular member 10 via balls 24 which form endless trains. The circuit for each train of balls includes an outer straight course (Figure 1) provided by a passage 30 formed by complementary grooves in members 10 and 20 and an inner straight course provided by a passage 32 formed by an internal groove in member 20 and a retainer 34. The retainer 34 will be seen as a half-tube, i. e. as cup or U-shaped in cross-section, and as having arcuate end portions 36 whereby transfer of the balls between the straight courses is effected. As shown in Figure 1, the ends of the arcuate portions of the retainer are cut out so as to provide deflector fingers 40, promoting smoothness in the ball pick-up.

To secure the retainers in place, there is supplied a ring element 44 at each end of the member 20, each such element being distorted (46) for the accommodation of the curved end portions of the retainers. In the case of the particular embodiment, the rings 44 are shown as fastened to the member 20 by screws 50, but other means may, of course, be employed.

On the foregoing, it should be clear that the invention provides a ball spline well suited for the purpose contemplated and for other purposes. It should also be apparent that a ball spline construction conforming to the invention involves a minimum number of parts and that these may be readily fabricated and assembled at unusually low cost.

What I claim is:

1. A motion-transmitting device comprising an outer tubular member having at least one internal groove paralleling the axis thereof, an inner hollow member having an external groove paralleling the axis thereof and radially aligned with said first groove to form a passage therewith, said inner hollow member further having an internal groove paralleling said first two grooves and radially aligned therewith, retainer means covering the said internal groove in said inner member and having curved end portions in communication with the opposed ends of said passage, and a train of anti-friction elements carried in the endless circuit provided by said grooves and said retainer means.

2. A motion-transmitting device comprising an outer tubular member having at least one internal groove paralleling the axis thereof, an inner hollow member having an external groove paralleling the axis thereof and radially aligned with said first groove to form a passage therewith, said inner hollow member further having an internal groove paralleling said first two grooves and radially aligned therewith, a retainer element generally U-shaped in cross-section and including a substantially straight portion and curved end portions, said retainer element being secured to said inner member with said straight portion covering the internal groove therein and with said curved end portions in communication with the opposed ends of said passage, and a train of balls carried in the endless circuit provided by said grooves and said retainer element, said balls serving as anti-friction elements and allowing for relative axial movement of said members while preventing relative rotary movement thereof.

3. A device as defined by claim 2 wherein the securing means for said retainer element takes the form of a pair of ring members fixed to said inner member, one at each end thereof, each said ring member having a distortion for the accommodation of the corresponding curved end portion of said retainer element.

4. A device as defined by claim 3 in which said inner member has splines at either side of the internal groove therein.

References Cited in the file of this patent

UNITED STATES PATENTS

| 1,918,108 | Jonkhoff | July 11, 1933 |
| 2,791,894 | Duckworth | May 14, 1957 |

FOREIGN PATENTS

| 975,115 | France | Oct. 11, 1950 |